Patented Dec. 5, 1933

1,937,718

UNITED STATES PATENT OFFICE 1,937,718

PRODUCTION OF DYESTUFFS AND INTERMEDIATES

Cecil Shaw and John Thomas, Grangemouth, Scotland, assignors to Scottish Dyes Limited, Grangemouth, Scotland No Drawing. Application October 13, 1930, Serial No. 488,550, and in Great Britain October 17, 1929

8 Claims. (Cl. 260—61)

This invention relates to the preparation of dyestuffs and intermediates and has for its object to provide improved or modified dyestuffs and improved or modified processes for making dyestuffs particularly dyestuffs of the black, blue-black, grey and like series especially dyestuffs capable of dyeing dark shades.

The invention in brief consists in a process which comprises the treatment of nitrodibenzanthrone, nitro-iso-dibenzanthrone and derivatives of these two bodies with phthalic anhydride at a temperature at which the phthalic anhydride is in the liquid phase preferably at a temperature of about the boiling point of the mixture.

The invention also consists in the process which comprises the application of products such as may be made by processes as indicated herein as colouring matters, for example, vat dyestuffs or as intermediates for the production of colouring matters or of other colouring matters.

The invention also consists in products including coloured materials such as may be made by processes substantially as herein described or by the equivalents of those processes, especially when so made.

The following examples illustrate how the invention may be carried into effect, references to parts being to parts by weight:—

Example 1

50 parts of phthalic anhydride are melted in an iron pot provided with an agitator and air reflux condenser. 20 parts of nitrodibenzanthrone are then added and the temperature raised until the mixture boils.

The colour of the melt is at first blue, but becomes redder as the heating is continued. This is done until a sample dissolved in concentrated sulphuric acid gives a red-violet colour as against the blue-violet colour of nitrodibenzanthrone.

The melt is then poured while molten into water and extracted with water until all the phthalic acid is removed. The insoluble residue is then dried. It forms a black powder dissolving in concentrated sulphuric acid in a red-violet colour. This powder is soluble in caustic soda and sodium hydrosulphite solution. It gives a blue vat which dyes cotton in grey or black shades, according to strength without the necessity for bleaching.

Example 2

100 parts of a mixture of nitrodibenzanthrone and nitro-iso-dibenzanthrone (made by nitrating a mixture of dibenzanthrone and iso-dibenzanthrone in nitrobenzene) are mixed with 500 parts of phthalic anhydride and heated to 250–260° C. until no further change in shade is appreciable. The product is worked up in similar manner to the previous example and gives a black paste dyeing cotton from the vat in redder shades than those obtained from nitrodibenzanthrone and the redness of the shade can be controlled by the amount of nitro-iso-dibenzanthrone included in the mixed nitro-compounds.

General

The invention is not limited to the examples given above.

Where reference is made to the dibenzanthrone series this includes the iso-dibenzanthrone series.

Among the advantages of employing phthalic anhydride, attention is drawn to the fact that it provides a medium in which the reaction, especially in the case of dibenzanthrone and iso-dibenzanthrone can be carried out at its optimum temperature, namely in the neighbourhood of 230–250° C. and that by simple extraction with water the dyestuff is obtained in a condition for immediate use.

According to the process described above, it is possible to obtain new vat dyestuffs dyeing in black, blue-black, grey and similar dark shades.

Having now described our invention, what we claim as new and desire to secure by Letters Patent is:—

1. A process for the production of dyestuffs and intermediates which consists in heating together phthalic anhydride and a member of the group consisting of nitro-dibenzanthrone and nitro-iso-dibenzanthrone at a temperature at which the phthalic anhydride is in the liquid phase.

2. A process as claimed in claim 1 in which the temperature is maintained at about 230 to about 250° C.

3. A process as claimed in claim 1 in which heating is effected to about the boiling point of the mixture.

4. A process for the production of dyestuffs and intermediates which consists in heating together phthalic anhydride and a member of the group consisting of nitro-dibenzanthrone and nitro-iso-dibenzanthrone at a temperature at which the phthalic anhydride is in the liquid phase and then extracting the dyestuff with water.

5. Products which may be made by the process of claim 1.

6. Products such as may be made by the process of claim 2.

7. Products such as may be made by the process of claim 3.

8. Products such as may be made by the process of claim 4.

CECIL SHAW.
JOHN THOMAS.